Figure 1:
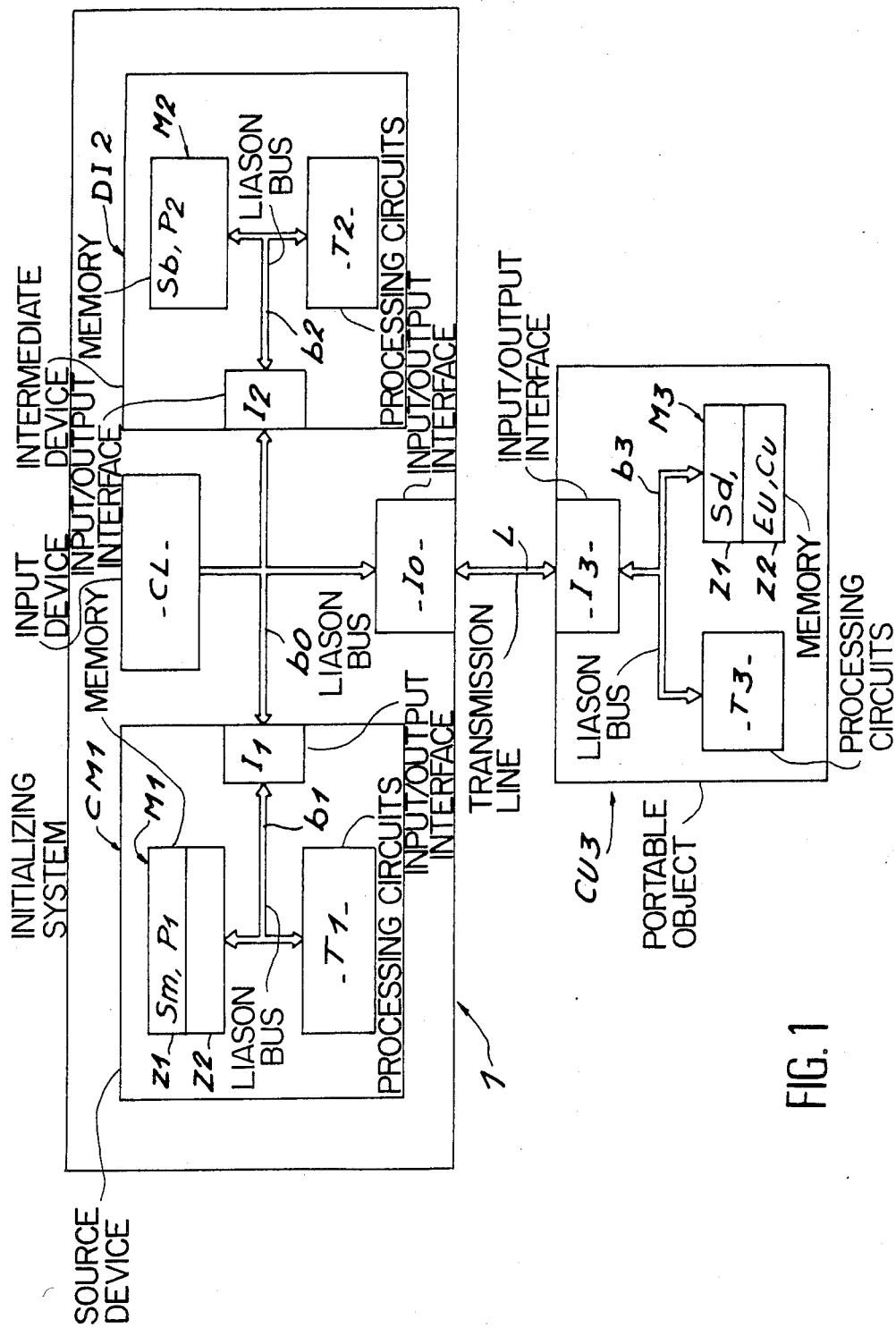

United States Patent [19]

Hazard

[11] Patent Number: 4,811,393
[45] Date of Patent: Mar. 7, 1989

[54] METHOD AND SYSTEM FOR DIVERSIFICATION OF A BASIC KEY AND FOR AUTHENTICATION OF A THUS-DIVERSIFIED KEY

[75] Inventor: Michel Hazard, Mareil/Mauldre, France

[73] Assignee: Bull, S.A., Paris, France

[21] Appl. No.: 171,877

[22] PCT Filed: Jul. 9, 1987

[86] PCT No.: PCT/FR87/00273
§ 371 Date: Mar. 10, 1988
§ 102(e) Date: Mar. 10, 1988

[87] PCT Pub. No.: WO88/00744
PCT Pub. Date: Jan. 28, 1988

[30] Foreign Application Priority Data

Jul. 17, 1986 [FR] France ................. 86 10416

[51] Int. Cl.⁴ .......... H04L 9/00; G07D 7/00; G06K 5/00
[52] U.S. Cl. ................. 380/21; 235/380; 340/825.34; 380/23; 380/28; 380/48
[58] Field of Search ............ 340/825.34; 235/380; 380/21, 23, 28, 48

[56] References Cited

U.S. PATENT DOCUMENTS

| | | |
|---|---|---|
| 4,295,039 | 10/1981 | Stuckert . |
| 4,438,824 | 3/1984 | Mueller-Schloer . |
| 4,670,857 | 6/1987 | Rackman ................. 380/4 |
| 4,748,668 | 5/1988 | Shamir et al. ............ 380/30 |

FOREIGN PATENT DOCUMENTS

| | | |
|---|---|---|
| 0055986 | 7/1982 | European Pat. Off. . |
| 0064779 | 11/1982 | European Pat. Off. . |
| 0117907 | 9/1984 | European Pat. Off. . |
| 0138386 | 4/1985 | European Pat. Off. . |
| 0168667 | 1/1986 | European Pat. Off. . |

OTHER PUBLICATIONS

IBM Tech. Disc. Bulletin, vol. 24, No. 12, May '82, p. 6504.

Primary Examiner—Stephen C. Buczinski
Attorney, Agent, or Firm—Kerkam, Stowell Kondracki & Clarke

[57] ABSTRACT

The subject of the invention is a method for diversification of a basic key and for authentication of a thus-diversified key as having been fashioned on the basis of a predetermined basic key, and a system for performing the method.

An initializing system calculates a diversified key (Sd) on the basis of a basic key (Sb) processed by a biunique combination transformation (T). The key (Sd) recorded in the memory (M31) of a user card (CU3) is authenticated by an exploitation system (4), which calculates a certificate on the basis of the basic key (Sb), while the card (CU3) calculates a certificate on the basis of its key (Sd). These certificates must be identical, taken into account the properties of the transformation (T).

The invention is applicable in particular to the secret keys recorded in memory cards.

46 Claims, 2 Drawing Sheets

METHOD AND SYSTEM FOR DIVERSIFICATION OF A BASIC KEY AND FOR AUTHENTICATION OF A THUS-DIVERSIFIED KEY

The subject of the invention is a method for diversification of a basic key and for authentication of a thus-diversified key as having been fashioned on the basis of a predetermined basic key, and a system for performing the method.

A method of this kind makes it possible in particular to diversify the secret keys recorded in portable carriers such as memory cards.

The development of applications that use portable objects such as cards is substantially due to the advent of memory cards, one essential feature of which is that they have processing circuits. These circuits generally include a microprocessor, which performs calculations not only on the data input from the outside, but above all on internal data that are inaccessible from outside.

Such cards are distributed to users by authorized entities that offer to furnish services by way of apparatuses or terminals made available to the public, and to which the user couples his card temporarily.

Generally, no apparatus furnishes the service requested until after first being assured that the card has indeed been established initially as capable of giving access to this service.

In fact, it must be avoided at any cost that a card established for access to a service (A) can also be used for access to a service (B), or that a defrauder can design or simulate a counterfeit card giving access to the service (A) and/or (B).

These objects are generally attained by means of preliminary establishment of an exchange of data, in the form of a dialogue between the card and the apparatus.

One type of dialogue, as described in U.S. Pat. No. 4,471,216 of the present applicant, corresponding to its French Pat. No. 2 469 760, takes into account a secret key known only to the authorized entity and recorded both in the card and in the apparatus. By way of example, the card calculates a result which is a function of its secret key, and the apparatus calculates a similar result which is the function of its secret key. The results are compared by the apparatus, which does not authorize access to the service requested except in the case of identity, or agreement, between these results. This condition cannot be satisfied unless the keys on the card and in the apparatus are identical.

Thus any apparatus designed for furnishing a given service is able to recognize all of the cards that will have been issued by an authorized entity for obtaining access to this service.

However, for the same secret key recorded in an apparatus, there are n cards of the same family having this secret key (n may be as many as several million, especially in banking applications). If a defrauder succeeds in gaining access to the secret of this key, then he is in a position to be able to manufacture and distribute cards that are counterfeit, yet will be recognized as valid by the apparatuses. One such event would be catastrophic, and would necessitate changing the secret key and distributing new cards.

To overcome this disadvantage, the invention provides for the diversification of the secret keys of the cards, on the basis of the same basic key, while enabling the apparatus to recognize them as having been fashioned on the basis of the same base key. Thus each card will have its own secret key, different from the keys assigned to other cards.

The invention accordingly proposes a method for diversification of a basic key by an initialization system, each basic key thus diversified being recorded in a memory of a target device, and for effecting recognition by an exploitation system that the diversified key recorded in a target device has indeed been fashioned on the basis of a predetermined basic key, characterized in that it comprises:

for diversifying a basic key (Sb) prerecorded in a memory of the initialization system, causing calculation by the processing circuits of this system of a diversified key (Sd) such that:

$$Sd = Du\ (T)\ Sb$$

where (Du) is a diversification parameter assigned to each target device and (T) is a biunique combinational transformation, and recording this key (Sd) in the memory of the target device, and for effecting recognition of the diversified key (Sd) of a target device as having been fashioned on the basis of a basic key (Sb), coupling the target device with an exploitation system having a memory in which the basic key (Sb) is recorded, causing calculation by the processing circuits of this system of an intermediate parameter (Pu) such that:

$$Pu = Cu\ (T)\ Du$$

where (Cu) is a datum proper to each target device, (T) is the aforementioned transformation and (Du) is the aforementioned diversification parameter, and causing calculation on the one hand by the exploitation system of a certificate (R1) such that:
$R1 = f3\ (K1,\ Ex)$ with $K1 = Sb\ (T)\ Pu$ where (Ex) is an external datum, and on the other hand by the target device of a certificate (R2) such that:

$$R2 = f4\ (K2,\ Ex)$$

with $K2 = Sd\ (T)\ Cu$ these two certificates being identical, if the diversified key (Sd) of the target device has indeed been calculated on the basis of the same basic key (Sb) as that recorded in the exploitation system (4).

According to one feature of the method, the transformation (T) is an exclusive-OR function.

Further advantages, characteristics and details will become apparent from the ensuing description of an exemplary embodiment, referring to the appended drawings.

Figure 2:
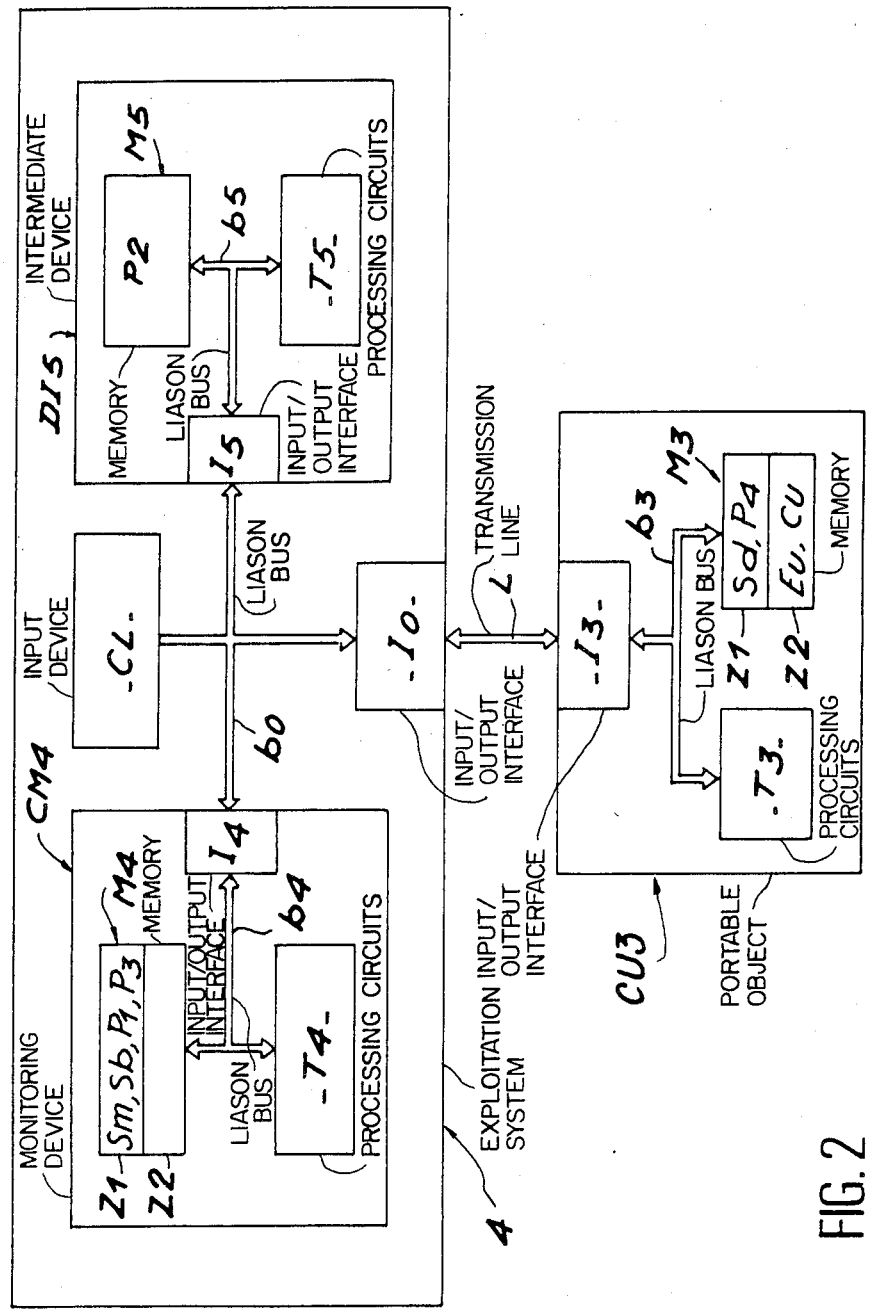

FIG. 1 schematically shows an initialization system, illustrating the first phase of the method according to the invention; and FIG. 2 schematically shows an exploitation system, illustrating the second phase of the method according to the invention.

Generally, the method according to the invention is organized into an initializing phase and an exploitation phase.

The initializing phase comprises the following:

causing the calculation by an initialization system of a diversified key on the basis of a predetermined basic key, and recording this secret key, thus diversified, in a memory of a portable object.

This first phase is performed by an authorized entity, which then issues the portable object to a user, each portable object having a different secret key. Each user can then request access to services by means of his portable object, but this access cannot be validated until after monitoring based on the recognition of the diversified key recorded in the portable object. This monitoring is the subject of the second phase, or exploitation phase, which will be described below.

The initializing system (1) shown in FIG. 1 comprises, in particular, a source device (CMI), an intermediate device (DI2), an input device such as a keyboard (CL) and an input/output interface (I0).

The source device (CM1) in particular comprises a memory (M1), processing circuits (T1) such as a microprocessor, and an input/output interface (I1). All of these circuits are connected with one another via a liason bus (b1).

In the memory (M1) of the source device (CM1), at least the following data are recorded:

an intermediate secret key (Sm), and a calculation program (P1), the function of which will be explained hereinafter.

The intermediate device (DI2) in particular comprises a memory (M2), processing circuits (T2) such as a microprocessor, and an input/output interface (I2). All of these circuits are connected with one another via a liason bus (b2).

The memory (M2) of the intermediate device (I2) contains the following data:

a predetermined basic key (Sb), and a program (P2) the function of which will be explained hereinafter.

The interfaces (II, I2) of the source device (CM1) and of the intermediate device (DI2) are connected with one another, as well as with the keyboard (CL) and the initializing interface (1), by a liason bus (b0).

A portable object (CU3) to be initialized comprises in particular a memory (M3), processing circuits (T3) such as a microprocessor, and an input/output interface (I3). All of these circuits are connected with one another via a liason bus (b3).

In a preferred embodiment, the portable object (CU3) or user card comprises a memory card such as that described in U.S. Pat. Nos. 4,211,919 and 4,382,279, respectively corresponding to the French Pat. Nos. 2 401 459 and 2 461 301 of the present applicant.

The user card (CU3) is coupled with the initializing system via a transmission line (L) which connects the interfaces (I0, I3). One such line (L) is described in particular in U.S. Pat. No. 4,556,958, corresponding to French Pat. No. 2 483 713 of the present applicant.

The initialization system (1) thus has as its function the calculation of a diversified key (Sd), on the basis of a predetermined basic key (Sb).

The principle of this calculation is as follows. In a first period of time, a diversification parameter (Du) is calculated on the basis of data specific to each user card to be initialized and on the basis of an intermediate basic key (Sm). In a second time period, the diversified key (Sd) is calculated on the basis of the diversification parameter (Du) and the predetermined basic key (Sb).

In a first embodiment, the calculation of the diversification parameter (Du) is performed by the source device (CM1) and the calculation of the diversified key (Sd) is performed by the intermediate device (DI2).

More precisely, the processing circuits (T1) of the source device (CM1) execute the aforementioned program (P1) for calculating a diversification parameter (Du) such that:

$$Du = f1 \ (Sm, \ Eu, \ Cu)$$

where (Sm) is the aforementioned intermediate basic key recorded in the memory (M1), (Eu) is a datum specific to the user card (CU3) entered at the keyboard (CL) and recorded in the memory (M3), and (Cu) is a diversification datum specific to the user card (CU3) and either being external and entered at the keyboard (CL) prior to being recorded in the memory (M3) or being internal and already prerecorded in the memory (M3).

Next, the intermediate device (DI2) calculates a diversified key (Sd) on the basis of the predetermined basic key (Sb) recorded in its memory (M2) and of the diversification parameter (Du) calculated by the source device (CM1) and transmitted via the bus (b0) to the intermediate device (DI2).

The diversified key (Sd) is calculated by the processing circuits (T2), which execute the program (P2) that is the implementation of a biunique combinational transformation (Te) such that:

$$Sd = Sb \ (T) \ Du$$

By way of example, this transformation is an EXCLUSIVE-OR function.

Finally, the diversified key (Sd) thus calculated is recorded in the memory (M3) of the card (CU3).

It should be noted that the memory (M3) of the user card (CU3) is advantageously divided into at least two zones (Z1, Z2). The memory zone (Z1) is such that the data, once recorded, are inaccessible from the outside but are uniquely accessible by the processing circuits (T3). The memory zone (Z2) is such that the recorded data can be read but not modified from the outside. Memory accesses of this kind are described in particular in U.S. Pat. No. 4,211,919 of the present applicant, corresponding to its French Pat. No. 2 401 459.

As the memory zone (Z1) enables safeguarding the secret of the recorded data, the diversified key (Sd) is recorded in this zone while the data (Eu, Cu) specific to the user are recorded in zone (Z2).

The initialization phase described above is generally completed by the writing into the memory (M3) of the card (CU3) of a plurality of other data specific to each application.

A user card initialized in this way by an authorized entity is issued to a user, who can then obtain the furnishing of a service, to which his card gives him a right, by coupling it to an apparatus or terminal assigned the task of furnishing this service and under the management of the authorized entity.

Prior to assuring the furnishing of the service, the apparatus must assure itself that the card presented has an authentic secret key; that is, that this key has indeed been calculated on the basis of the basic key that is specific to the service requested and is prerecorded in any apparatus assigned to furnish this service. Contrarily, either a counterfeit card, or a card that is valid but has not been initialized for obtaining the furnishing of the service dispensed by this apparatus, will be detected by the apparatus.

This monitoring is the subject of the second phase of the method, or exploitation phase, as will be described referring to FIG. 2.

The exploitation system (4) comprises a monitoring device (CM4), an intermediate device (DI5), an input device (CL) such as a keyboard, for example, and an input/output interface (IO).

The monitoring device (CM4), in particular, comprises a memory (M4), processing circuits (T4) such as a microprocessor, and an input/output interface (I4). All of these circuits are connected with one another via a liason bus (b4).

In the memory (M4), at least the following data are recorded:

the secret keys (Sm, Sb) used during the initializing phase, the program (Pl) also used in the initializing phase for calculating the diversification parameter (Du), and a program (P3) the function of which will be explained hereinafter.

The intermediate device (DI5), in particular, comprises a memory (M5), processing circuits (T5) such as a microprocessor, and an input/output interface (I5). All of these circuits are connected with one another via a liason bus (b5).

The memory (M5) of the intermediate device (DI5) contains at least the same program (P2), the function of which will be explained hereinafter.

The interfaces (I4, I5) of the monitoring device (CM4) and of the intermediate device (DI5) are connected with one another and with the keyboard (CL) and the interface (IO) of the exploitation system (4) via a liason bus (b0).

Let it be assumed that a user card has been previously initialized and has been coupled temporarily to the exploitation system (4). This coupling is attained via a transmission line (L) of the type mentioned above, which connects the interface (IO) of the system (4) and the interface (I3) of the card (CU3).

In a first period of time, the monitoring device (CM4) recalculates the diversification parameter (Du) by the execution of the program (Pl) by the processing circuits (T4). This parameter (Du) is such that:

$$Du = f1 (Sm, Eu, Cu)$$

where the parameters (Eu, Cu) have been taken from the memory (M3) of the user card (CU3).

Once calculated, the diversification parameter is transmitted to the intermediate device (DI5), the processing circuits (T5) of which will execute the program (P2) in order to obtain a parameter (Pu) such that:

$$Pu = Du (T) Cu$$

where (Cu) is the parameter taken from the memory (M3) of the user card (CU3).

At this stage of the method, it is important to note one original feature of the invention. The monitoring device (CM4) and the intermediate device (DI5) do not recalculate a diversified key (Sd) directly on the basis of a basic key (Sb) in order to subsequently compare it with that recorded in the user card (CU3). Thus the diversified key (Sd) is even better protected.

However, in order to permit recognition of the diversified key (Sd) recorded in the user card (CU3), the monitoring device (CM4) and the card (CU3) will respectively calculate the result known as the certificate. These certificates will be identical if the diversified key (Sd) of the card (CU3) has been calculated on the basis of the same basic key (Sb) as that recorded in the memory (M4) of the monitoring device (CM4). The identity of the two certificates is based on the relationships that exist between the secret keys (Sb, Sd) and the parameters (Pu, Du) as explained below.

A first certificate or result (R1) is calculated by the processing circuits (T4) of the monitoring device (CM4) by execution of the program (P3) recorded in the memory (M4). This result (R1) is such that:

$$R1 = f3 (K1, Ex)$$

$$\text{with } K1 = Sb (T) Pu$$

where (Sb) is the basic key recorded in the memory (M4), (Pu) is the parameter calculated by the intermediate device (DI5), and (Ex) is an external datum entered for example at the keyboard (CL) by an operator or by the user.

On their part, the processing circuits (T3) of the user card (CU3) execute the program (P4) that is prerecorded in the memory (M3) at the time of the initialization phase, in order to obtain a second certificate or result (R2) such that:

$$R2 = f4 (K2, Ex)$$

$$\text{with } K2 = Sd (T) Cu$$

where (Sd) is the diversified key recorded in the memory (M3), (Cu) is the parameter sampled in the memory zone (Z2), and (Ex) is the aforementioned external datum.

If the diversified key (Sd) has indeed been calculated on the basis of a basic key (Sb) identical to that recorded in that monitoring device (CM4), then the two results (R1, R2) will be identical, for the following reasons:

the intermediate parameter (K2) for calculating the result (R2) is such that:

$$K2 = Sd (T) Cu$$

$$\text{and } Sd = Sb (T) Du$$

$$\text{hence } K2 = Sb (T) Du (T) Cu$$

$$\text{and } Pu = Cu (T) Du$$

hence $K2 = Sb (T) Pu = K1$ (intermediate parameter used for the calculation of the result R1).

All of these equalities are satisfied, because the transformation (T) used is a commutative transformation.

It will be understood that if at least one of these equations is not satisfied, the diversified key (Sd) of the target device (CU3) will not be recognized as authentic, and the dialogue is broken off.

From the above, it is apparent that the source device (CM1) and the intermediate device (DI2) of the initializing system (1), as well as the monitoring device (CM4) and the intermediate device (DI5) of the exploitation system (4), contain data that must remain secret to prevent fraud, which could comprise making counterfeit user cards (CU3) that would be recognized as authentic by the monitoring device (CM4).

Accordingly, it is indispensible to take security measures to protect access to the data contained in the memories (M1, M2, M4 and M5).

A first solution comprises taking measures of physical or material protection making access to these memories difficult.

A second solution comprises, once the data have been written, locking the accesses to the memory in such a way as to make them inacessible from outside, but uniquely accessible by the processing circuits respectively associated with these memories.

This second solution is satisfactory if the memories correspond with the memories of portable objects such as the user cards (CU3). More precisely, the memory (M1) and the processing circuits (T1) of the source device (CM1) of the initialization system (1), on the one hand, and the memory (M4) and the processing circuits (T4) of the monitoring device (CM4) of the exploitation system (4) on the other hand, are integrated into a card of the user type where each memory (MI, M4) is divided into at least two memory zones (Z1, Z2).

A third solution comprises grouping the source device (CM1) and the intermediate device (DI2) of the initialization system (1) within the same device, designed for example in the form of an integrated circuit package having the same characteristics of access to the memory as a card of the aforementioned kind. This solution is equally applicable to the monitoring device (CM4) and to the intermediate device (DI5) of the exploitation system (4).

As a variant of this third solution, the integrated circuit package mentioned above is included in a portable object, and in particular in a memory card of the aforementioned kind.

I claim:

1. A method for diversification of a basic key by an initialization system, each basic key thus diversified being recorded in a memory of a target device, and for effecting recognition by an exploitation system that the diversified key recorded in a target device has indeed been fashioned on the basis of a predetermined basic key, characterized in that it comprises:

for diversifying a basic key (Sb) prerecorded in a memory of the initialization system (1), causing calculation by the processing circuits (T1, T2) of this system (1) of a diversified key (Sd) such that:

Sd=Du (T) Sb where (Du) is a diversification parameter assigned to each target device (CU3) and (T) is a biunique combinational transformation, and recording this key (Sd) in the memory (M3) of the target device (CU3), and for effecting recognition of the diversified key (Sd) of a target device (CU3) as having been fashioned on the basis of a basic key (Sb), coupling the target device (CU3) with an exploitation system (4) having a memory (M4) in which the basic key (Sb) is recorded, causing calculation by the processing circuits (T4, T5) of this system (4) of an intermediate parameter (Pu) such that:

Pu=Cu (T) Du where (Cu) is a datum proper to each target device (CU3), (T) is the aforementioned transformation and (Du) is the aforementioned diversification parameter, and causing calculation on the one hand by the exploitation system (4) of a certificate (R1) such that:

R1=f3 (K1, Ex)

with K1=Sb (T) Pu)

where (Ex) is an external datum, and on the other hand by the target device (CU3) of a certificate (R2) such that:

R2=f4 (K2, Ex)

with K2=Sd (T) Cu these two certificates being identical, if the diversified key (Sd) of the target device (CU3) has indeed been calculated on the basis of the same basic key (Sb) as that recorded in the exploitation system (4).

2. A method as defined by claim 1, characterized in that it comprises causing the calculation by the initialization system (1) of the aforementioned diversification parameter (Du) by the execution of a program (P1) which is recorded in its memory (M1) and which takes into account a datum (Eu) specific to the target device (CU3).

3. A method as defined by claim 2, characterized in that the aforementioned program (P1) also takes into account an intermediate key (Sm) prerecorded in the memory (M1) of the initialization system (1).

4. A method as defined by claim 1, characterized in that it comprises causing the calculation by the exploitation system (4) of the aforementioned diversification parameter (Du) by the execution of a program (P1) which is recorded in its memory (M4), and which takes into account a datum (Eu) specific to the target device (CU3).

5. A method as defined by claim 4, characterized in that the aforementioned program (P1) also takes into account an intermediate key (Sm) prerecorded in the memory (M4) of the exploitation system (4).

6. A method as defined by claim 1, characterized in that it comprises using an EXCLUSIVE-OR function for the aforementioned transformation (T).

7. An initialization system for performing the method as defined by claim 1, characterized in that it comprises, for initializing a target device (CU3) with a diversified key (Sd):

means for coupling (I0, I3, L) the following elements with the target device (CU3): a memory (M2) in which a basic key (Sb) and a program (P2) are recorded, and processing circuits (T2) for calculating the diversified key (sd) by execution of the program (P2) which is the implementation of a biunique combinational transformation (T), and such that:

Sd=Sb (T) Du where (Du) is a diversification parameter specific to each target device (CU3).

8. A system as defined by claim 7, characterized in that it also includes processing circuits (T1) for calculating the aforementioned diversification parameter (Du) by execution of a program (P1) recorded in a memory (M1), and which takes into account at least one datum (Eu) specific to the target device (CU3).

9. A system as defined by claim 8, characterized in that the aforementioned program (P1) also takes into account an intermediate key (Sm) prerecorded in the memory (M1).

10. A system as defined by claim 7, characterized in that the processing circuits (T1) and the aforementioned memory (M1) are integrated in a portable object such as a memory card (CM1).

11. A system as defined by claim 7, characterized in that the processing circuits (T1, T2) and the aforementioned memories (M1, M2) are integrated in an integrated circuit package.

12. A system as defined by claim 11, characterized in that the aforementioned package is accommodated in a portable object such as a memory card.

13. An exploitation system for performing the method as defined by claim 1, characterized in that it includes, for recognition of the diversified key (Sd) recorded in a target device (CU3);

means (I0, I3, L) for coupling the following elements with the target device (CU3):

a memory (M5) in which a program (P2) is recorded, and processing circuits (T5) for calculating an intermediate parameter (Pu) by execution of the program (F2) which is the implementation of a biunique combinational transformation (T), and such that:

$$Pu = Du\ (T)\ Cu$$

where (Du) is a diversification parameter specific to each target device (CU3), and (Cu) is a datum specific to each target device (CU3), a memory (M4) in which are recorded a basic key (Sb) and a program (P3), and processing circuits (T4) for calculating a certificate (R1) by execution of the program (P3), and such that:

$$R1 = f3\ (K1,\ Ex)$$

with $K1 = Sb\ (T)\ Pu$ where (Ex) is an external datum.

14. A system as defined by claim 13, characterized in that the aforementioned memory (M4) also includes a program (P1) executed by the processing circuits (T4) for calculating the aforementioned diversification parameter (Du) and which takes into account at least one datum (Eu) specific to the target device (CU3).

15. A system as defined by claim 14, characterized in that the aforementioned program (P1) also takes into account an intermediate key (Sm) prerecorded in the memory (M4).

16. A system as defined by claim 13, characterized in that the memory (M4) and the processing circuits (T4) are integrated in a portable object (CM4) such as a memory card.

17. A system as defined by claim 13, characterized in that the memories (M4, M5) and that the processing circuits (T4, T5) are integrated in an integrated circuit package.

18. A system as defined by claim 17, characterized in that the aforementioned package is accommodated in a portable object such as a memory card.

19. A system as defined by claim 13, characterized n that the memory (M3) of the target device (CU3) coupled with said system contains a program (P4) executed by the processing circuits (T3) for calculating a certificate (R2), such that:

$$R2 = f4\ (Ex,\ K2)$$

with $K2 = Sd\ (T)\ Cu$ where (Ex) is the aforementioned external datum, and this certificate (R2) must be identical to the aforementioned certificate (R1) calculated by said system.

20. A system as defined by claim 13, characterized in that the target device (CU3) is a portable object such as a memory card.

21. An initialization system for performing the method as defined by claim 2, characterized in that it comprises, for initializing a target device (CU3) with a diversified key (Sd):

means for coupling (I0, I3, L) the following elements with the target device (CU3): a memory (M2) in which a basic key (Sb) and a program (P2) are recorded, and processing circuits (T2) for calculating the diversified key (Sd) by execution of the program (P2) which is the implementation of a biunique combinational transformation (T), and such that:

$$Sd = Sb\ (T)\ Du$$

where (Du) is a diversification parameter specific to each target device (CU3).

22. An initialization system for performing the method as defined by claim 3, characterized in that it comprises, for initializing a target device (CU3) with a diversified key (Sd):

means for coupling (I0, I3, L) the following elements with the target device (CU3): a memory (M2) in which a basic key (Sb) and a program (P2) are recorded, and processing circuits (T2) for calculating the diversified key (Sd) by execution of the program (P2) which is the implementation of a biunique combinational transformation (T), and such that:

$$Sd = Sb\ (T)\ Du$$

where (Du) is a diversification parameter specific to each target device (CU3).

23. An initialization system for performing the method as defined by claim 4, characterized in that it comprises, for initializing a target device (CU3) with a diversified key (Sd):

means for coupling (I0, I3, L) the following elements with the target device (CU3): a memory (M2) in which a basic key (Sb) and a program (P2) are recorded, and processing circuits (T2) for calculating the diversified key (Sd) by execution of the program (P2) which is the implementation of a biunique combinational transformation (T), and such that:

$$Sd = Sb\ (T)\ Du$$

where (Du) is a diversification parameter specific to each target device (CU3).

24. An initialization system for performing the method as defined by claim 5, characterized in that it comprises, for initializing a target device (CU3) with a diversified key (Sd):

means for coupling (I0, I3, L) the following elements with the target device (CU3): a memory (M2) in which a basic key (Sb) and a program (P2) are recorded, and processing circuits (T2) for calculating the diversified key (Sd) by execution of the program (F2) which is the implementation of a biunique combinational transformation (T), and such that:

$$Sd = Sb\ (T)\ Du$$

where (Du) is a diversification parameter specific to each target device (CU3).

25. An initialization system for performing the method as defined by claim 6, characterized in that it comprises, for initializing a target device (CU3) with a diversified key (Sd):
means for coupling (I0, I3, L) the following elements with the target device (CU3): a memory (M2) in which a basic key (Sb) and a program (P2) are recorded, and processing circuits (T2) for calculating the diversified key (Sd) by execution of the program (P2) which is the implementation of a biunique combinational transformation (T), and such that:

$$Sd = Sb\ (T)\ Du$$

where (Du) is a diversification parameter specific to each target device (CU3).

26. A system as defined by claim 8, characterized in that the processing circuits (T1) and the aforementioned memory (M1) are integrated in a portable object such as a memory card (CM1).

27. A system as defined by claim 9, characterized in that the processing circuits (T1) and the aforementioned memory (M1) are integrated in a portable object such as a memory card (CM1).

28. A system as defined by claim 8, characterized in that the processing circuits (T1, T2) and the aforementioned memories (M1, M2) are integrated in an integrated circuit package.

29. A system as defined by claim 9, characterized in that the processing circuits (T1, T2) and the aforementioned memories (M1, M2) are integrated in an integrated circuit package.

30. An exploitation system for performing the method as defined by claim 2, characterized in that it includes, for recognition of the diversified key (Sd) recorded in a target device (CU3):
a memory (M5) in which a program (P2) is recorded, and processing circuits (T5) for calculating an intermediate parameter (Pu) by execution of the program (P2) which is the implementation of a biunique combinational transformation (T), and such that:

$$Pu = Du\ (T)\ Cu$$

where (Du) is a diversification parameter specific to each target device (CU3), and (Cu) is a datum specific to each target device (CU3),
a memory (M4) in which are recorded a basic key (Sb) and a program (P3), and processing circuits (T4) for calculating a certificate (R1) by execution of the program (P3), and such that:

$$R1 = f3\ (K1,\ Ex)$$

with $K1 = Sb\ (T)\ Pu$ where (Ex) is an external datum.

31. An exploitation system for performing the method as defined by claim 3, characterized in that it includes, for recognition of the diversified key (Sd) recorded in a target device (CU3):
means (I0, I3, L) for coupling the following elements with the target device (CU3):
a memory (M5) in which a program (P2) is recorded, and processing circuits (T5) for calculating an intermediate parameter (Pu) by execution of the program (P2) which is the implementation of a biunique combinational transformation (T), and such that:

$$Pu = Du\ (T)\ Cu$$

where (Du) is a diversification parameter specific to each target device (CU3), and (Cu) is a datum specific to each target device (CU3),
a memory (M4) in which are recorded a basic key (Sb) and a program (P3), and processing circuits (T4) for calculating a certificate (R1) by execution of the program (P3), and such that:

$$R1 = f3\ (K1,\ Ex)$$

with $K1 = Sb\ (T)\ Pu$ where (Ex) is an external datum.

32. An exploitation system for performing the method as defined by claim 4, characterized in that it includes, for recognition of the diversified key (Sd) recorded in a target device (CU3):
means (I0, I3, L) for coupling the following elements with the target device (CU3):
a memory (M5) in which a program (P2) is recorded, and processing circuits (T5) for calculating an intermediate parameter (Pu) by execution of the program (P2) which is the implementation of a biunique combinational transformation (T), and such that:

$$Pu = Du\ (T)\ Cu$$

where (Du) is a diversification parameter specific to each target device (CU3), and (Cu) is a datum specific to each target device (CU3),
a memory (M4) in which are recorded a basic key (Sb) and a program (P3), and processing circuits (T4) for calculating a certificate (R1) by execution of the program (P3), and such that:

$$R1 = f3\ (K1,\ Ex)$$

with $K1 = Sb\ (T)\ Pu$ where (Ex) is an external datum.

33. An exploitation system for performing the method as defined by claim 5, characterized in that it includes, for recognition of the diversified key (Sd) recorded in a target device (CU3):

means (I0, I3, L) for coupling the following elements with the target device (CU3):
a memory (M5) in which a program (P2) is recorded, and processing circuits (T5) for calculating an intermediate parameter (Pu) by execution of the program (P2) which is the implementation of a biunique combinational transformation (T), and such that:

$$Pu = Du \ (T) \ Cu$$

where (Du) is a diversification parameter specific to each target device (CU3), and (Cu) is a datum specific to each target device (CU3), a memory (M4) in which are recorded a basic key (Sb) and a program (P3), and processing circuits (T4) for calculating a certificate (R1) by execution of the program (P3), and such that:

$$R1 = f3 \ (K1, \ Ex)$$

with $K1 = Sb \ (T) \ Pu$ where (Ex) is an external datum.

34. An exploitation system for performing the method as defined by claim 6, characterized in that it includes, for recognition of the diversified key (Sd) recorded in a target device (CU3):

means (I0, I3, L) for coupling the following elements with the target device (CU3):

a memory (M5) in which a program (P2) is recorded, and processing circuits (T5) for calculating an intermediate parameter (Pu) by execution of the program (P2) which is the implementation of a bi-unique combinational transformation (T), and such that:

$$Pu = Du \ (T) \ Cu$$

where (Du) is a diversification parameter specific to each target device (CU3), and (Cu) is a datum specific to each target device (CU3), a memory (M4) in which are recorded a basic key (Sb) and a program (P3), and processing circuits (T4) for calculating a certificate (R1) by execution of the program (P3), and such that:

$$R1 = f3 \ (K1, \ Ex)$$

with $K1 = Sb \ (T) \ Pu$ where (Ex) is an external datum.

35. A system as defined by claim 14, characterized in that the memory (M4) and the processing circuits (T4) are integrated in a portable object (CM4) such as a memory card.

36. A system as defined by claim 15, characterized in that the memory (M4) and the processing circuits (T4) are integrated in a portable object (CM4) such as a memory card.

37. A system as defined by claim 14, characterized in that the memories (M4, M5) and that the processing circuits (T4, T5) are integrated in an integrated circuit package.

38. A system as defined by claim 15, characterized in that the memories (M4, M5) and that the processing circuits (T4, T5) are integrated in an integrated circuit package.

39. A system as defined by claim 14, characterized in that the memory (M3) of the target device (CU3) coupled with said system contains a program (P4) executed by the processing circuits (T3) for calculating a certificate (R2), such that $$R2 = f4 \ (Ex, \ K2)$$

with $K2 = Sd \ (T) \ Cu$ where (Ex) is the aforementioned external datum, and this certificate (R2) must be identical to the aforementioned certificate (R1) calculated by said system.

40. A system as defined by claim 15, characterized in that the memory (M3) of the target device (CU3) coupled with said system contains a program (P4) executed by the processing circuits (T3) for calculating a certificate (R2), such that $$R2 = f4 \ (Ex, \ K2)$$

with $K2 = Sd \ (T) \ Cu$ where (Ex) is the aforementioned external datum, and this certificate (R2) must be identical to the aforementioned certificate (R1) calculated by said system.

41. A system as defined by claim 14, characterized in that the target device (CU3) is a portable object such as a memory card.

42. A system as defined by claim 15, characterized in that the target device (CU3) is a portable object such as a memory card.

43. A system as defined by claim 16, characterized in that the target device (CU3) is a portable object such as a memory card.

44. A system as defined by claim 17, characterized in that the target device (CU3) is a portable object such as a memory card.

45. A system as defined by claim 18, characterized in that the target device (CU3) is a portable object such as a memory card.

46. A system as defined by claim 19, characterized in that the target device (CU3) is a portable object such as a memory card.

* * * * *

UNITED STATES PATENT AND TRADEMARK OFFICE
CERTIFICATE OF CORRECTION

PATENT NO. : 4,811,393

DATED : March 7, 1989

INVENTOR(S) : Hazard

It is certified that error appears in the above-identified patent and that said Letters Patent is hereby corrected as shown below:

Title page:

Abstract, line 8, "M31)" should be --(M3)--.
In Claim 13, line 4, "CU3);" should be -- (CU3):--.
In Claim 13, line 10,"(F2)" should be --(P2)--.
In Claim 19, line 1, "n" should be --in--.
In Claim 24, line 10,"(F2)" should be --(P2)--.
In Claim 30, line 5, after "(CU3):" insert --means (I0,I3,L) for coupling the following elements with the target device (CU3):--.
In Claim 30, line 21, "K1=Sb(T)Fu" should be --K1=Sb(T)Pu--.
In Claim 32, line 5, "(I0,13,L)" should be --(I0,I3,L)--.

Signed and Sealed this

Third Day of April, 1990

*Attest:*

HARRY F. MANBECK, JR.

*Attesting Officer*　　　　　　*Commissioner of Patents and Trademarks*